United States Patent [19]

Han

[11] Patent Number: 5,363,406
[45] Date of Patent: Nov. 8, 1994

[54] PULSE WIDTH MODULATION APPARATUS

[75] Inventor: Dae K. Han, Kyungsangbook-Do, Rep. of Korea

[73] Assignee: Goldstar Electron Co., Ltd., Choongchungbook-Do, Rep. of Korea

[21] Appl. No.: 112,281

[22] Filed: Aug. 27, 1993

[30] Foreign Application Priority Data

Sep. 4, 1992 [KR] Rep. of Korea ............... 16837/1992

[51] Int. Cl.⁵ ............................................. H03K 7/08
[52] U.S. Cl. ................................... 375/22; 332/109; 327/172; 327/31
[58] Field of Search ................. 375/22; 307/234; 328/111; 341/53; 332/109

[56] References Cited

U.S. PATENT DOCUMENTS 4,257,108 3/1981 Igel ........................................ 375/22

FOREIGN PATENT DOCUMENTS 037124 8/1987 Japan ..................................... 375/22

Primary Examiner—Tesfaldet Bocure
Attorney, Agent, or Firm—Lowe, Price, LeBlanc & Becker

[57] ABSTRACT

A pulse width modulation apparatus having a storage circuit for temporarily storing pulse width data inputted over a data bus and then inverting it, the pulse width data determining a pulse width, a counting circuit for counting a clock signal in response to an external pulse width modulation enable signal and an external reset signal, a comparison circuit for comparing the number of logical 0 bits of the inverted pulse width data from the storage circuit with the number of logical 1 bits of count data from the counting circuit and outputting a high signal when the number of the logical 0 bits of the inverted pulse width data is greater than or equal to the number of the logical 1 bits of the count data and a low signal when the number of the logical 0 bits of the inverted pulse width data is smaller than the number of the logical 1 bits of the count data, and an output circuit for latching an output signal from the comparison circuit to output a pulse width modulation signal. Therefore, since the comparison of the pulse width data and the count data are performed only with PMOS and NMOS transistors of different current gains in the comparison circuit, the processing time can be reduced and the integration can be enhanced in manufacturing a single chip.

4 Claims, 3 Drawing Sheets

FIG.1
PRIOR ART
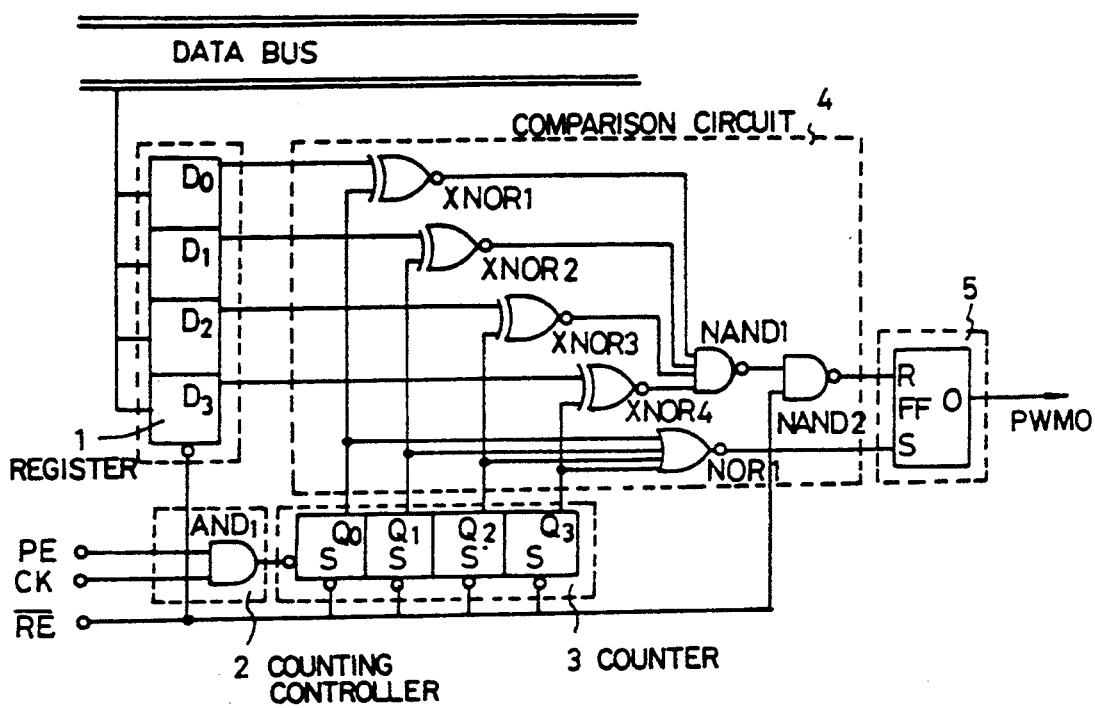
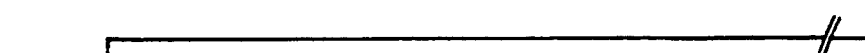
FIG.2A
PRIOR ART
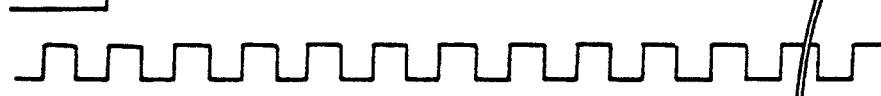
FIG.2B
PRIOR ART
FIG.2C
PRIOR ART
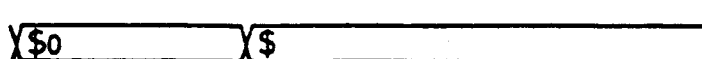
FIG.2D
PRIOR ART
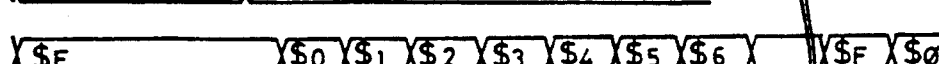
FIG.2E
PRIOR ART
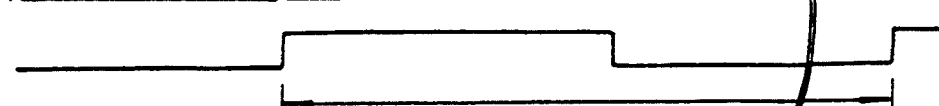
FIG.2F
PRIOR ART

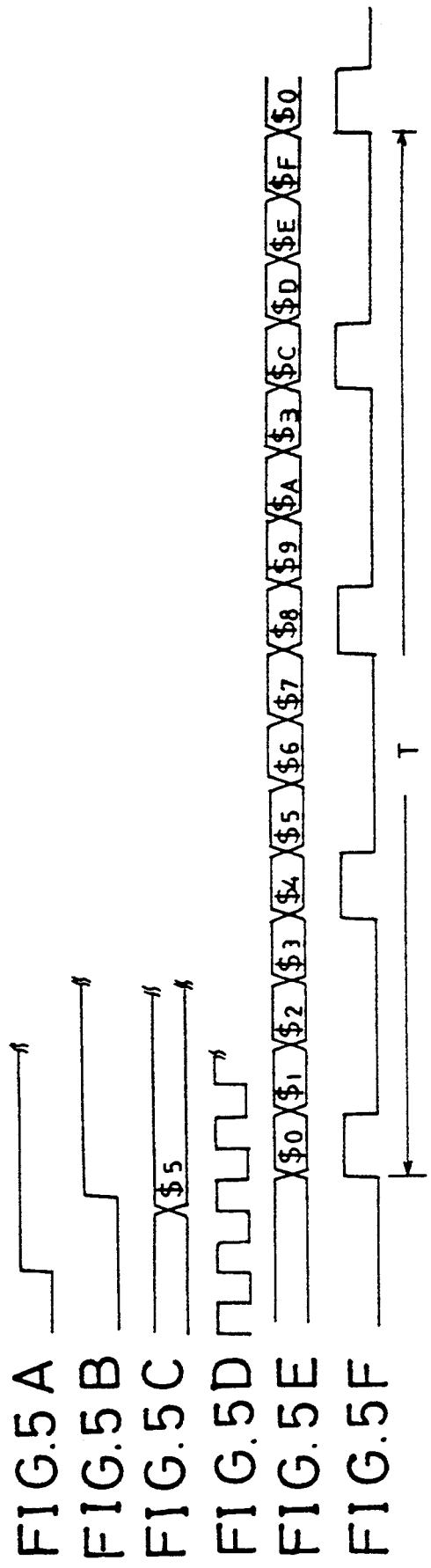

PULSE WIDTH MODULATION APPARATUS

BACKGROUND OF THE INVENTION

1. Field of the Invention

The present invention relates in general to pulse width modulation apparatus for modulating input signals to electronic appliances into pulse signals or digital signals, and more particularly to a pulse width modulation apparatus in which the processing speed is enhanced and the construction is simplified so that the integration can be enhanced in manufacturing a single chip.

2. Description of the Prior Art

Referring to FIG. 1, there is shown a functional block diagram of a conventional pulse width modulation apparatus. As shown in this drawing, the conventional pulse width modulation apparatus comprises a register 1 for temporarily storing purse width data D0–D3 inputted over a data bus, a counting controller 2 for controlling output of a clock signal CK inputted therein in response to an external pulse width modulation enable signal PE, and a counter 3 for counting the clock signal CK outputted from the counting controller 2 in response to an external reset signal RE.

A comparison circuit 4 is provided in the conventional pulse width modulation apparatus to compare the pulse width data D0–D3 from the register 1 with data Q0–Q3 from the counter 3 and output a high signal when the data Q0–Q3 from the counter 3 is greater than the pulse width data D0–D3 from the register 1 and a low signal when the data Q0–Q3 from the counter 3 is not greater than the pulse width data D0–D3 from the register 1.

An output unit 5 is also provided in the conventional pulse width modulation apparatus to latch an output signal from the comparison circuit 4, so as to output a pulse width modulation signal PWMO.

The operation of the conventional pulse width modulation apparatus with the above-mentioned construction will hereinafter be described with reference to FIG. 1 and FIGS. 2A to 2F which are waveform diagrams of the signals from the components in FIG. 1.

The pulse width data D0–D3 inputted over the data bus is temporarily stored in the register 1 and then applied to the comparison circuit 4. The external pulse width modulation enable signal PE as shown in FIG. 2A and the clock signal CK as shown in FIG. 2B are applied to the counting controller 2. When the external pulse width modulation enable signal PE and the clock signal CK are low, the counting controller 2 outputs the clock signal CK to the counter 3.

The counter 3 is operated under the control of the reset signal RE as shown in FIG. 2C. Namely, if the reset signal RE is high, the counter 3 counts the clock signal CK from the counting controller 2. On the contrary, if the reset signal RE is low, the counter 3 does not count the clock signal CK from the counting controller 2.

Then, the comparison circuit 4 compares the pulse width data D0–D3 from the register 1 as shown in FIG. 2D with the data Q0–Q3 from the counter 3 as shown in FIG. 2E. When the pulse width data D0–D3 from the register 1 is greater than the data Q0–Q3 from the counter 3, the comparison circuit 4 outputs a low signal to a reset terminal R of a flip-flop FF1 in the output unit 5. On the contrary, when the pulse width data D0–D3 from the register 1 is not greater than the data Q0–Q3 from the counter 3, the comparison circuit 4 outputs a high signal to the reset terminal S of the flip-flop FF1.

The signals applied to the set and reset terminals S and R are latched in the flip-flop FF1. As a result, the flip-flop FF1 outputs the pulse width modulation signal PWMO as shown in FIG. 2F in response to the signals latched therein.

For example, assume that the data Q0–Q3 from the counter 3 is hexa "0" and the pulse width data D0–D3 from the register 1 is hexa "5". In this case, logical low bits of the data Q0–Q3 of hexa "0" from the counter 3 are applied to exclusive-NOR gates XNOR1–XNOR4 of the comparison circuit 4. Also, logical high bits of the pulse width data D0–D3 of hexa "5" from the register 1 are applied to the exclusive-NOR gates XNOR1 and XNOR3 and logical low bits thereof are applied to the exclusive-NOR gates XNOR2 and XNOR4, Each of the exclusive-NOR gates XNOR1 and XNOR3 outputs a low signal because it inputs the high bit from the register 1 and the low bit from the counter 3. Each of the exclusive-NOR gates XNOR2 and XNOR4 outputs a high signal because it inputs the low bit from the register 1 and the low bit from the counter 3.

The low signals from the exclusive-NOR gates XNOR1 and XNOR3 and the high signals from the exclusive-NOR gates XNOR2 and XNOR4 are applied to a NAND gate NAND1 in the comparison circuit 4, thereby causing the NAND gate NAND1 to output a high signal.

Then, the high signal from the NAND gate NAND1 and the reset signal RE of high level as shown in FIG. 2C are applied to a NAND gate NAND2 in the comparison circuit 4, thereby causing the NAND gate NAND2 to output a low signal. The low signal from the NAND gate NAND2 is applied to the reset terminal R of the flip-flop FF1 in the output unit 5.

The logical low bits of the data Q0–Q3 of hexa "0" from the counter 3 are also applied to a NOR gate NOR1 in the comparison circuit 4, thereby causing the NOR gate NOR1 to output a high signal. The high signal from the NOR gate NOR1 is applied to the set terminal S of the flip-flop FF1 in the output unit 5.

As a result, the flip-flop FF1 outputs the pulse width modulation signal PWMO of high level as shown in FIG. 2F in response to the high and low signals applied respectively to the set and reset terminals S and R thereof.

Thereafter, when the counter 3 outputs the data Q0–Q3 of hexa "5" as it continues to count the clock signal CK from the counting controller 2, logical high bits of the data Q0–Q3 of hexa "5" from the counter 3 are applied to the exclusive-NOR gates XNOR1 and XNOR3 and logical low bits thereof are applied to the exclusive-NOR gates XNOR2 and XNOR4. Also, the logical high bits of the pulse width data D0–D3 of hexa "5" from the register 1 are applied to the exclusive-NOR gates XNOR1 and XNOR3 and the logical low bits thereof are applied to the exclusive-NOR gates XNOR2 and XNOR4. As a result, each of the exclusive-NOR gates XNOR1, XNOR2, XNOR3 and XNOR4 outputs a high signal.

The high signals from the exclusive-NOR gates XNOR1, XNOR2, XNOR3 and XNOR4 are applied to the NAND gate NAND1 in the comparison circuit 4, thereby causing the NAND gate NAND1 to output a low signal. The low signal from the NAND gate NAND1 is applied to the NAND gate NAND2 in the comparison circuit 4, which is also applied with the external reset signal RE of high level as shown in FIG. 2C. As a result, the NAND gate NAND2 outputs a high signal to the reset terminal R of the flip-flop FF1 in the output unit 5.

The logical low and high bits of the data Q0–Q3 of hexa "5" from the counter 3 are also applied to the NOR gate NOR1 in the comparison circuit 4, thereby causing the NOR gate NOR1 to output a low signal. The low signal from the NOR gate NOR1 is applied to the set terminal S of the flip-flop FF1 in the output unit 5.

As a result, the flip-flop FF1 outputs the pulse width modulation signal PWMO of low level as shown in FIG. 2F in response to the low and high signals applied respectively to the set and reset terminals S and R thereof.

With the above operation performed repeatedly, there can be obtained the pulse width modulation signal with a desired period and a desired width.

In other words, when the pulse width data D0–D3 from the register 1 is greater than the data Q0–Q3 from the counter 3, the conventional pulse width modulation apparatus outputs the pulse width modulation signal PWMO of high level. On the contrary, when the pulse width data D0–D3 from the register 1 is smaller than or equal to the data Q0–Q3 from the counter 3, the conventional pulse width modulation apparatus outputs the pulse width modulation signal PWMO of low level.

However, the above-mentioned conventional pulse width modulation apparatus has a disadvantage in that it outputs only one pulse every period, resulting in degradation in a frequency characteristic. Also, the use of a great number of devices like the NOR gate, the exclusive-NOR gates, the NAND gates and etc. reduces the data processing speed and the integration in manufacturing a single chip.

SUMMARY OF THE INVENTION

Therefore, the present invention has been made in view of the above problems, and it is an object of the present invention to provide a pulse width modulation apparatus in which pulse width data and count data are compared with each other by PMOS and NMOS transistors of different current gains, so that the processing time can be reduced and the integration can be enhanced in manufacturing a single chip.

In accordance with the present invention, the above and other objects can be accomplished by a provision of a pulse width modulation apparatus comprising: storage means for temporarily storing pulse width data inputted over a data bus and then inverting it, the pulse width data determining a pulse width; counting means for counting a clock signal in response to an external pulse width modulation enable signal and an external reset signal; comparison means for comparing the number of logical 0 bits of the inverted pulse width data from said storage means with the number of logical 1 bits of count data from said counting means and outputting a high signal when the number of the logical 0 bits of the inverted pulse width data is greater than or equal to the number of the logical 1 bits of the count data and a low signal when the number of the logical 0 bits of the inverted pulse width data is smaller than the number of the logical 1 bits of the count data; and output means for latching an output signal from said comparison means to output a pulse width modulation signal.

BRIEF DESCRIPTION OF THE DRAWINGS

The above and other objects, features and advantages of the present invention will be more clearly understood from the following detailed description taken in conjunction with the accompanying drawings, in which:

FIG. 1 is a functional block diagram of a conventional pulse width modulation apparatus;

FIGS. 2A to 2F are waveform diagrams of signals from components in the apparatus in FIG. 1;

FIGS. 5A to 5F are waveform diagrams of signals from components in the apparatus in FIG. 3.

DETAILED DESCRIPTION OF THE PREFERRED EMBODIMENTS

Figure 3:
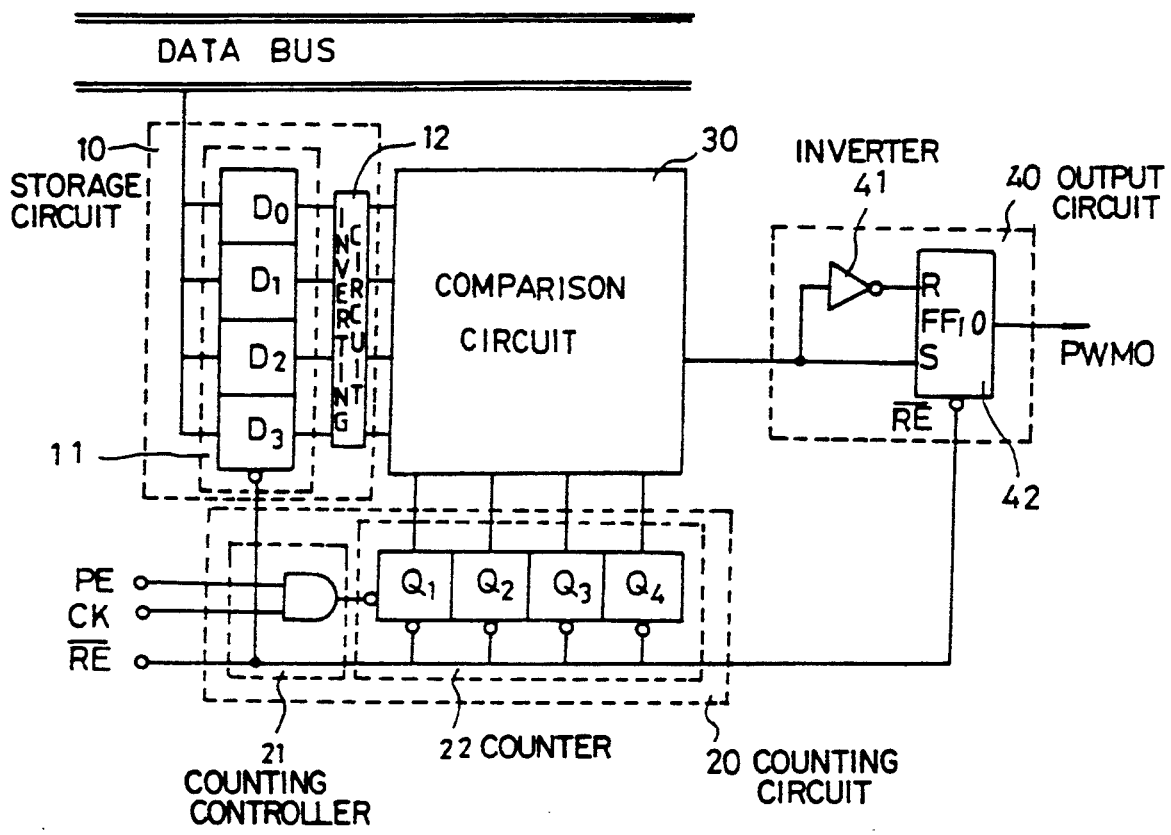
FIG. 3 is a functional block diagram of a pulse width modulation apparatus in accordance with the present invention.
Figure 4:
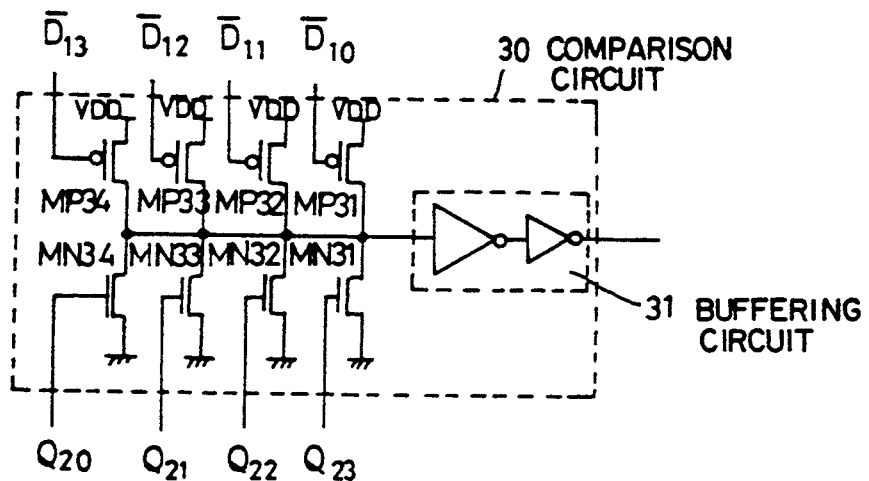
FIG. 4 is a circuit diagram of a comparison circuit in the apparatus in FIG. 3.

Referring to FIG. 3, there is shown a functional block diagram of a pulse width modulation apparatus in accordance with the present invention. As shown in this drawing, the pulse width modulation apparatus of the present invention comprises a storage circuit 10 for temporarily storing pulse width data D10–D13 inputted over a data bus and then inverting it, the pulse width data D10–D13 determining a pulse width.

A counting circuit 20 is provided in the pulse width modulation apparatus to count a clock signal CK in response to an external pulse width modulation enable signal PE and an external reset signal RE.

A comparison circuit 30 is also provided in the pulse width modulation apparatus to compare the number of logical 0 bits of the inverted pulse width data /D10–/D13 from the storage circuit 10 with the number of logical 1 bits of data Q20–Q23 from the counting circuit 20 and output a high signal when the number of the logical 0 bits of the inverted pulse width data/D10–/D13 is greater than or equal to the number of the logical 1 bits of the data Q20–Q23 and a low signal when the number of the logical 0 bits of the inverted pulse width data /D10–/D13 is smaller than the number of the logical 1 bits of the data Q20–Q23.

An output circuit 40 is also provided in the pulse width modulation apparatus to latch an output signal from the comparison circuit 30, so as to output a pulse width modulation signal PWMO.

The storage circuit 10 includes a register 11 for temporarily storing the pulse width data D10–D13 inputted over the data bus, and an inverting circuit 12 for inverting the pulse width data D10–D13 from the register 11.

The counting circuit 20 includes a counting controller 21 for controlling output of the clock signal CK inputted therein in response to the external pulse width modulation enable signal PE, and a counter 22 for counting the clock signal CK outputted from the counting controller 21 in response to the external reset signal RE.

The comparison circuit 30 includes a plurality of PMOS transistors MP31–MP34 each being turned on in response to a corresponding one of the logical 0 bits of the inverted pulse width data /D10–/D13 from the storage circuit 10, and a plurality of NMOS transistors MN31–MN34 having sources connected to drains of the PMOS transistors MP31–MP34, the NMOS transistors MN31–MN34 being turned on in response to the corresponding logical 1 bits of the data Q23–Q20 from the counting circuit 20 to transfer source currents of the PMOS transistors MP31–MP34 to the drains thereof.

A buffering circuit 31 is provided in the comparison circuit 30 to wave-shape output signals from the PMOS transistors MP31–MP34.

The output circuit 40 includes an inverter 41 for inverting the output signal from the comparison circuit 30, and a flip-flop 42 for performing a latching operation for the output signal from the comparison circuit 30 in response to the output signal from the comparison circuit 30 and an output signal from the inverter 41 to output the pulse width modulation signal PWMO.

The operation of the pulse width modulation apparatus with the above-mentioned construction in accordance with the present invention will hereinafter be described in detail with reference to FIGS. 3 and 4 and FIGS. 5A to 5F.

A power source voltage VDD, the external reset signal RE as shown in FIG. 5A and the pulse width data D10–D13 determining the pulse width are inputted by the pulse width modulation apparatus. The pulse width data D10–D13 as shown in FIG. 5C is applied to the storage circuit 10. In the storage circuit 10, the applied pulse width data D10–D13 is temporarily stored by the register 11 and then inverted by the inverting circuit 12. The pulse width data /D10–/D13 inverted by the inverting circuit 12 is applied to the comparison circuit 30.

Upon inputting the external pulse width modulation enable signal PE of high level as shown in FIG. 5B and the clock signal CK as shown in FIG. 5D, the counting controller 21 in the counting circuit 20 applies the clock signal CK inputted therein to the counter 22. In response to the reset signal RE as shown in FIG. 5A, the counter 22 counts the clock signal CK from the counting controller 21. As a result, the data Q20–Q23 as shown in FIG. 5E is outputted from the counter 22 to the comparison circuit 30.

The inverted pulse width data /D10–/D13 from the storage circuit 10 and the data Q20–Q23 from the counting circuit 20 are applied to the PMOS transistors MP31–MP34 and the NMOS transistors MN34–MN31 in the comparison circuit 30, respectively, to control the conduction of the corresponding transistor.

Namely, the logical low bits of the inverted pulse width data /D10–/D13 from the storage unit 10 turn on the corresponding PMOS transistors MP31–MP34. As a result, the source currents of the turned-on PMOS transistors MP31–MP34 are transferred to the drains thereof. The logical high bits of the data Q20–Q23 from the counting circuit 20 turn on the corresponding NMOS transistors MN34–MN31 connected to the drains of the PMOS transistors MP34–MP31.

In the case where the number of the logical low bits of the inverted pulse width data /D10–/D13 from the storage circuit 10 is greater than or equal to the number of the logical high bits of the data Q20–Q23 from the counting circuit 20, drain currents of the turned-on PMOS transistors MP31–MP34 are not applied to the sources of the NMOS transistors MN34–MN31. As a result, a high signal from the turned-on PMOS transistors MP31–MP34 is applied to the buffering circuit 31 in the comparison circuit 30.

When the number of the logical low bits of the inverted pulse width data /D10–/D13 from the storage circuit 10 is smaller than the number of the logical high bits of the data Q20–Q23 from the counting circuit 20, the drain currents of the turned-on PMOS transistors MP31–MP34 are applied to the sources of the NMOS transistors MN34–MN31. As a result, a low signal from the turned-on PMOS transistors MP31–MP34 is applied to the buffering circuit 31 in the comparison circuit 30.

Then, in the output circuit 40, the low or high signal wave-shaped by the buffering circuit 31 in the comparison circuit 30 is inverted by the inverter 41 and then applied to a reset terminal R of the flip-flop 42, a set terminal S of which is applied with the output signal from the buffering circuit 31. As a result, the flip-flop 42 outputs the pulse width modulation signal PWMO as shown in FIG. 5F in response to the signals applied respectively to the set and reset terminals S and R thereof.

For example, assume that the pulse width data D10–D13 of hexa "3" is applied to the storage circuit 10. In this case, the applied pulse width data D10–D13 of hexa "3" is inverted by the inverting circuit 12 and then applied to the PMOS transistors MP31–MP34 in the comparison circuit 30. Namely, the logical low bits of the inverted pulse width data D10–D13 of hexa "3" are applied to gates of the PMOS transistors MP31 and MP32, resulting in turning-on of the PMOS transistors MP31 and MP32. Also, the logical high bits thereof are applied to gates of the PMOS transistors MP33 and MP34, resulting in turning-off of the PMOS transistors MP33 and MP34. As a result, the source currents of the turned-on PMOS transistors MP31 and MP32 are transferred to the drains thereof.

In the case where the data Q20–Q23 from the counting circuit 20 is hexa "0" under the condition that the pulse width data D10–D13 of hexa "3" is applied to the storage circuit 10, all the NMOS transistors MN34–MN31 in the comparison circuit 30 are turned off since gates thereof are applied with the logical low bits of the data Q20–Q23 of hexa "0". As a result, a high signal from the drains of the turned-on PMOS transistors MP31 and MP32 is wave-shaped by the buffering circuit 31 in the comparison circuit 30. The output signal from the buffering circuit 31 is inverted by the inverter 41 in the output circuit 40 and then applied to the reset terminal R of the flip-flop 42 in the output circuit 40, the set terminal S of which is applied with the output signal from the buffering circuit 31. As a result, the flip-flop 42 outputs the pulse width modulation signal PWMO of high level as shown in FIG. 5F in response to the signals applied respectively to the set and reset terminals S and R thereof.

Thereafter, when the counter 22 in the counting circuit 20 outputs the data Q20–Q23 of hexa "1" as it continues to count the clock signal CK from the counting controller 21, the NMOS transistor MN34 in the comparison circuit 30 is turned on because of application of the logical high bit of the data Q20–Q23 of hexa "1", whereas the NMOS transistors MN31–MN33 in the comparison circuit 30 are turned off because of application of the logical low bits of the data Q20–Q23 of hexa "1". As a result, the drain currents of the PMOS transistors MP31 and MP32 turned on due to application of the inverted pulse width data /D10–/D13 of hexa "3" are transferred to the source of the turned-on NMOS transistor MN34, thereby causing the turned-on PMOS transistors MP31 and MP32 to output a low signal to the buffering circuit 31 in the comparison circuit 30. Namely, since the sum of current gains of the turned-on PMOS transistors MP31 and MP32 is smaller than a current gain of the turned-on NMOS transistor MN34, the low signal is outputted from the turned-on PMOS transistors MP31 and MP32. Then, the low signal from the turned-on PMOS transistors MP31 and MP32 is wave-shaped by the buffering circuit 31. The output signal from the buffering circuit 31 is inverted by the inverter 41 and then applied to the reset terminal R of the flip-flop 42, the set terminal S of which is applied with the output signal from the buffering circuit 31. As a result, the flip-flop 42 outputs the pulse width modulation signal PWMO of low level as shown in FIG. 5F in response to the signals applied respectively to the set and reset terminals S and R thereof.

Also, when the counter 22 in the counting circuit 20 outputs the data Q20–Q23 of hexa "4" as it continues to count the clock signal CK from the counting controller 21, the NMOS transistor MN32 in the comparison circuit 30 is turned on because of application of the logical high bit of the data Q20–Q23 of hexa "4", whereas the NMOS transistors MN31, MN33 and MN34 in the comparison circuit 30 are turned off because of application of the logical low bits of the data Q20–Q23 of hexa "4". As a result, a high signal from the PMOS transistors MP31 and MP32 turned on due to application of the inverted pulse width data /D10–/D13 of hexa "3" are transferred to the buffering circuit 31 in the comparison circuit 30. Namely, since the sum of current gains of the turned-on PMOS transistors MP31 and MP32 is larger than a current gain of the turned-on NMOS transistor MN32, the high signal is outputted from the turned-on PMOS transistors MP31 and MP32. Then, the high signal from the turned-on PMOS transistors MP31 and MP32 is wave-shaped by the buffering circuit 31 in the comparison circuit 30. The high output signal from the buffering circuit 31 is applied directly to the set terminal S of the flip-flop 42 in the output circuit 40 and through the inverter 41 to the reset terminal R thereof. As a result, the flip-flop 42 outputs the pulse width modulation signal PWMO of high level as shown in FIG. 5F in response to the signals applied respectively to the set and reset terminals S and R thereof.

Then, when the counter 22 in the counting circuit 20 outputs the data Q20–Q23 of hexa "5" as it continues to count the clock signal CK from the counting controller 21, the NMOS transistors MN32 and MN34 in the comparison circuit 30 are turned on because of application of the logical high bits the data Q20–Q23 of hexa "5", whereas the NMOS transistors MN31 and MN33 in the comparison circuit 30 are turned off because of application of the logical low bits of the data Q20–Q23 of hexa "5". As a result, the drain currents of the PMOS transistors MP31 and MP32 turned on due to application of the inverted pulse width data /D10–/D13 of hexa "3" are transferred to the sources of the turned-on NMOS transistors MN32 and MN34, thereby causing the turned-on PMOS transistors MP31 and MP32 to output a low signal to the buffering circuit 31 in the comparison circuit 30. Namely, since the sum of current gains of the turned-on PMOS transistors MP31 and MP32 is larger than the sum of current gains of the turned-on NMOS transistors MN32 and MN34, the low signal is outputted from the turned-on PMOS transistors MP31 and MP32. Then, the low signal from the turned-on PMOS transistors MP31 and MP32 is wave-shaped by the buffering circuit 31 in the comparison circuit 30. The low output signal from the buffering circuit 31 is applied directly to the set terminal S of the flip-flop 42 in the output circuit 40 and through the inverter 41 to the reset terminal R thereof. As a result, the flip-flop 42 outputs the pulse width modulation signal PWMO of low level as shown in FIG. 5F in response to the signals applied respectively to the set and reset terminals S and R thereof.

With the above operation performed repeatedly, there can be obtained the pulse width modulation signal PWMO with a desired period and a desired width as shown in FIG. 5F.

As apparent from the above description, according to the present invention, the comparison of the pulse width data and the count data are performed only with the PMOS and NMOS transistors of different current gains, so that the processing time can be reduced and the integration can be enhanced in manufacturing a single chip. Namely, the pulse width modulation signal of high level is outputted when the number of the logical 0 bits of the inverted pulse width data is greater than or equal to the number of the logical 1 bits of the count data and the pulse width modulation signal of low level is outputted when the number of the logical 0 bits of the inverted pulse width data is smaller than the number of the logical 1 bits of the count data.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pulse width modulation apparatus comprising:
   storage means for temporarily storing pulse width data inputted over a data bus and then inverting it, the pulse width data determining a pulse width;
   counting means for counting a clock signal in response to an external pulse width modulation enable signal and an external reset signal;
   comparison means for comparing the number of logical 0 bits of the inverted pulse width data from said storage means with the number of logical 1 bits of count data from said counting means and outputting a high signal when the number of the logical 0 bits of the inverted pulse width data is greater than or equal to the number of the logical 1 bits of the count data and a low signal when the number of the logical 0 bits of the inverted pulse width data is smaller than the number of the logical 1 bits of the count data; and
   output means for latching an output signal from said comparison means to output a pulse width modulation signal.

2. A pulse width modulation apparatus as set forth in claim 1, wherein said storage means includes:
   a register for temporarily storing the pulse width data inputted over the data bus; and
   an inverting circuit for inverting the pulse width data from said register.

3. A pulse width modulation apparatus as set forth in claim 1, wherein said comparison means includes:
   a plurality of PMOS transistors, each being turned on in response to a corresponding one of the logical 0 bits of the inverted pulse width data from said storage means;
   a plurality of NMOS transistors having sources connected to drains of said PMOS transistors, said NMOS transistors being turned on in response to the corresponding logical 1 bits of the data from said counting means to transfer source currents of said PMOS transistors to the drains thereof; and a buffering circuit for wave-shaping output signals from said PMOS transistors.

4. A pulse width modulation apparatus as set forth in claim 1, wherein said output means includes:
   an inverter for inverting the output signal from said comparison means; and
   a flip-flop for performing a latching operation for the output signal from said comparison means in response to the output signal from said comparison means and an output signal from said inverter to output the pulse width modulation signal.

* * * * *